United States Patent
Kuwada

(10) Patent No.: US 7,482,766 B2
(45) Date of Patent: Jan. 27, 2009

(54) MOTOR DRIVE DEVICE

(75) Inventor: Katsuji Kuwada, Kariya (JP)

(73) Assignee: Denso Corporation, Kariya (JP)

( * ) Notice: Subject to any disclaimer, the term of this patent is extended or adjusted under 35 U.S.C. 154(b) by 237 days.

(21) Appl. No.: 11/606,198

(22) Filed: Nov. 29, 2006

(65) Prior Publication Data

US 2007/0126378 A1 Jun. 7, 2007

(30) Foreign Application Priority Data

Dec. 2, 2005 (JP) ............................. 2005-348874

(51) Int. Cl.
*H02P 6/16* (2006.01)
(52) U.S. Cl. .................. 318/109; 318/700; 318/400.01; 318/400.06; 318/400.13; 318/400.23
(58) Field of Classification Search ................. 318/109, 318/400.01, 400.06, 400.13, 400.23, 700
See application file for complete search history.

(56) References Cited

U.S. PATENT DOCUMENTS

| 4,459,519 | A | * | 7/1984 | Erdman | 318/400.08 |
| 4,588,912 | A | * | 5/1986 | Shinmura et al. | 310/68 R |
| 5,506,775 | A | * | 4/1996 | Tsurushima et al. | 701/45 |
| 5,814,965 | A | * | 9/1998 | Randall | 318/701 |
| 6,347,987 | B1 | * | 2/2002 | Ichishi et al. | 454/75 |
| 6,864,653 | B2 | * | 3/2005 | Heydt | 318/434 |
| 7,034,427 | B2 | * | 4/2006 | Hirzel | 310/191 |
| 2002/0043962 | A1 | * | 4/2002 | Taniguchi et al. | 322/28 |
| 2004/0061470 | A1 | * | 4/2004 | Ito et al. | 318/565 |

FOREIGN PATENT DOCUMENTS

| JP | 09-023687 | 1/1997 |
| JP | 2005-238951 | 9/2005 |

* cited by examiner

*Primary Examiner*—Rita Leykin
(74) *Attorney, Agent, or Firm*—Harness, Dickey & Pierce, PLC

(57) ABSTRACT

A motor drive device, for driving an electric motor having a bearing for rotatably supporting an output shaft, has a drive circuit which drives the motor when a voltage level at a signal input terminal of the drive circuit becomes greater than a threshold value. The voltage level at the signal input terminal becomes greater than the threshold value for a certain period when a power switch is turned on or off.

5 Claims, 4 Drawing Sheets

(a) REGULATOR INPUT VOLTAGE (b) REGULATOR OUTPUT VOLTAGE (c) VOLTAGE SV AT CONTROL TERMINAL Ta (a) REGULATOR OUTPUT VOLTAGE (b) VOLTAGE SV AT CONTROL TERMINAL Ta

MOTOR DRIVE DEVICE

BACKGROUND OF THE INVENTION

1. Field of the Invention

The present invention relates to a motor drive device for driving an electric motor.

2. Description of Related Art

The structure of a conventional electric blower, for a vehicle seat air-conditioning device, will be schematically described with reference to FIG. 5.

The electric blower includes a brushless motor 1, and a vane wheel 5 fixed to an output shaft 1a of the brushless motor 1. The brushless motor 1 includes a rotor 3 fixed to the output shaft 1a, a stator 2 arranged on the inside of the rotor 3, and a bearing 4 for rotatably supporting the output shaft 1a. The bearing 4 consists of an inner ring 4a fixed to the output shaft 1a, an outer ring 4b fixed to a yoke 2a of the stator 2 and balls 4c interposed between the inner ring 4a and the outer ring 4b.

The electric blower is incorporated in the back of a seat or in a seat cushion. The electric blower can vibrate when the vehicle travels on a rough road such as a gravel road. The inner ring 4a, outer ring 4b and balls 4c in the bearing 4 vibrate when the electric blower vibrates.

When the electric blower is stopped, there is no change in the contact positions of the outer ring 4b, balls 4c and inner ring 4a. Therefore, if the electric blower vibrates many times when the electric blower stops, the contact positions are damaged. As a result, the bearing 4 is damaged and may generate abnormal noises.

Therefore, to absorb vibration and protect the bearing, a vibration-absorbing material such as an urethane material is arranged between the electric blower and the seat.

The seat air-conditioning device for a vehicle described above, however, is more costly due to the use of the vibration-absorbing material to absorb the vibration of the electric blower.

SUMMARY OF THE INVENTION

In view of the above point, therefore, an object of the present invention is to provide a motor drive device which suppresses damage to the bearing without using any vibration-absorbing material.

The present invention was accomplished by focusing on changing the bearing damage position using the motor drive.

According to a first aspect of the present invention, a motor drive device has a drive circuit (30) to drive the electric motor when a voltage level at the signal input becomes greater than a threshold value (xV) in response to a control signal, wherein, when the power source switch is turned on, the voltage level of the signal input (Ta) becomes greater than the threshold value for a certain period (Ton1).

When the power source switch is turned on, therefore, the drive circuit (30) drives the electric motor to change the contact positions in the bearing. This prevents the same positions in the bearings from being damaged many times and, thus, suppresses damage to the bearings without using any vibration-absorbing material.

According to a second aspect of the present invention, the control circuit (30) drives the electric motor when a voltage level at the signal input becomes greater than a threshold value in response to a control signal, wherein, when the power source switch is turned off, the voltage level at the signal input terminal (Ta) becomes greater than the threshold value for a certain period (Ton2).

When the power source switch is turned off, therefore, the control circuit (30) drives the electric motor to change the contact positions in the bearings. This prevents the same positions in the bearings from being damaged many times and, thus, suppresses damage to the bearings without using any vibration-absorbing material.

Reference numerals in parentheses described in the above paragraphs correspond to those of concrete elements described in the embodiments below.

DESCRIPTION OF THE PREFERRED EMBODIMENT

First Embodiment

Figure 1:
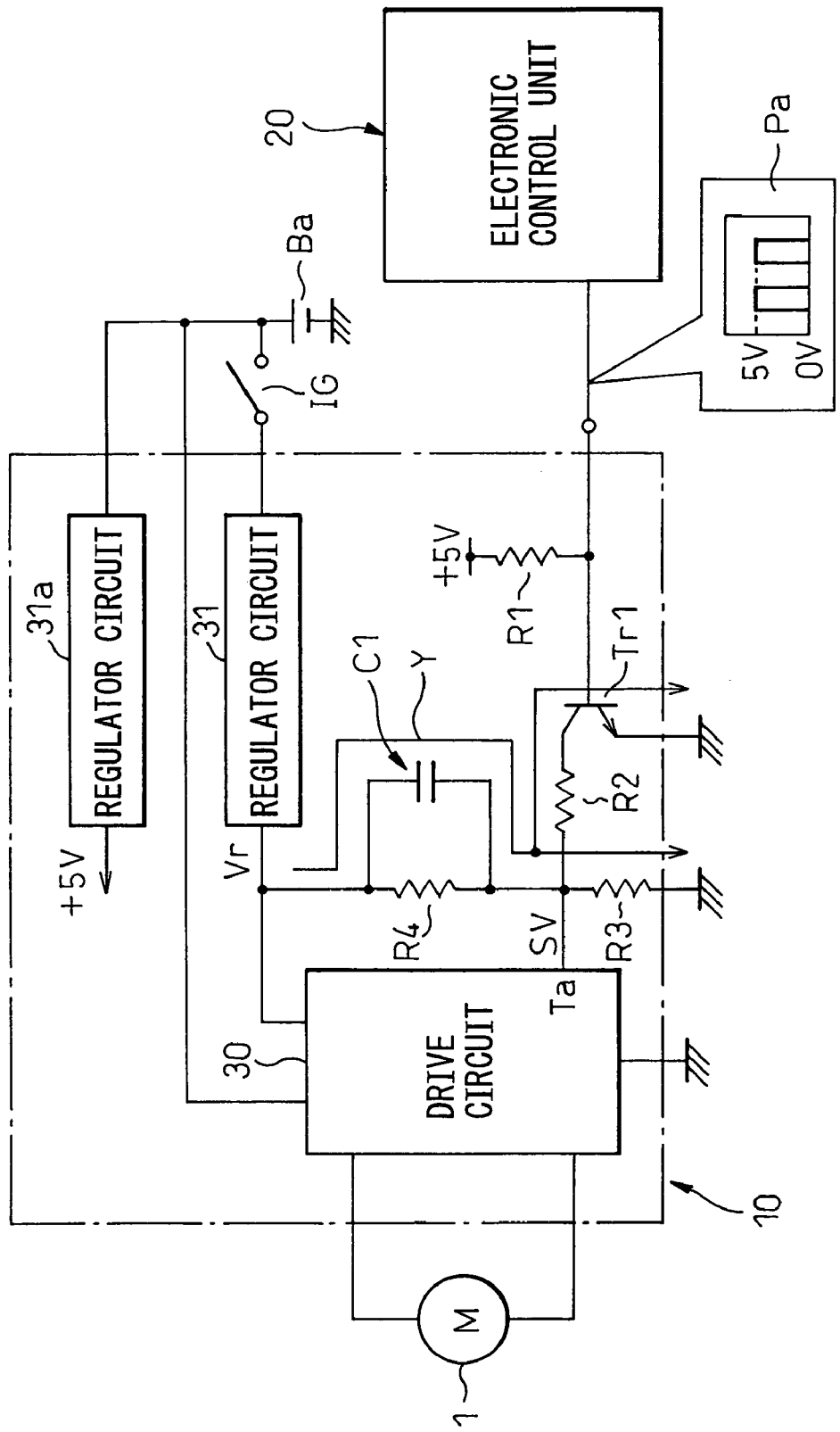
FIG. 1 is a circuit diagram illustrating an electric circuit of a first embodiment of a motor drive device of the present invention.
Figure 5:
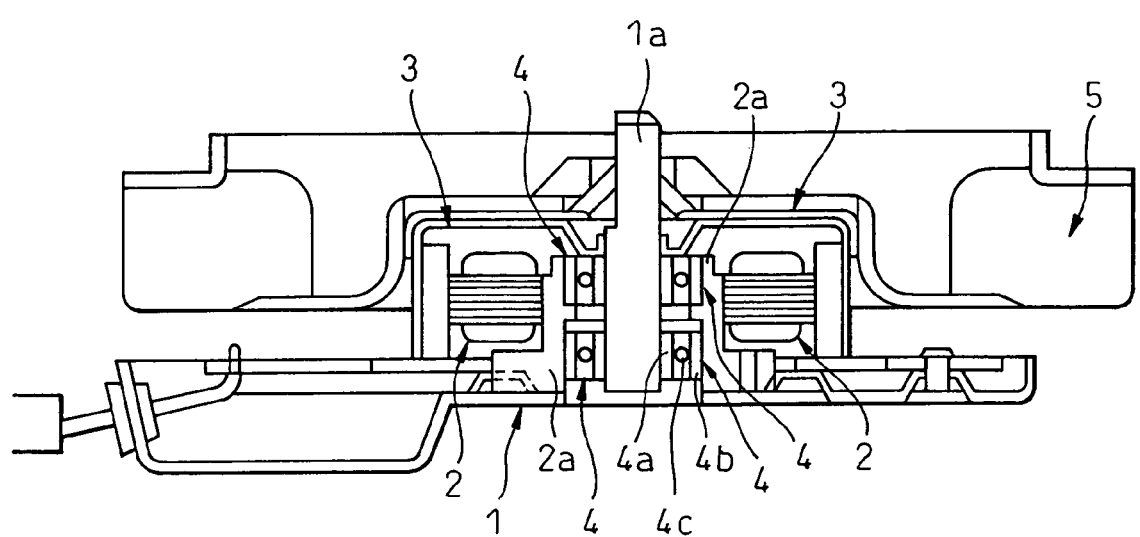
FIG. 5 is a sectional view schematically illustrating the structure of an electric blower.

FIG. 1 illustrates an electric circuit of a motor drive device 10 for a blower in a seat air-conditioning device according to a first embodiment of the invention. A brushless motor 1 driven by the motor drive device 10 is a conventional motor which, as shown in FIG. 5, has a vane wheel 5 fixed to the output shaft 1a, and has bearings 4 which rotatably support the output shaft 1a.

The motor drive device 10 of this embodiment consists of a drive circuit 30, first and second regulator circuits 31 and 31a, a transistor Tr1, resistance elements R1, R2, R3 and R4, and a capacitor C1.

The first regulator circuit 31 receives electric power from a car-mounted battery Ba through an ignition switch IG and produces a constant voltage (e.g., 5 V). The second regulator circuit 31a is directly connected to the car-mounted battery Ba. The regulator circuit 31a directly receives the electric power from the Battery Ba and produces a constant voltage (e.g., 5 V).

The drive circuit 30 has a control terminal Ta as a signal input and drives the brushless motor 1 when the voltage level at the control terminal Ta exceeds a threshold value xV in response to a pulse signal Pa (control signal) from an electronic control unit 20.

It should be noted that, in the drive circuit 30, a circuit of the motor drive system receives the electric power from the car-mounted battery Ba, while a circuit of the logic system receives electric power from the first regulator circuit 31.

In response to a pulse signal Pa sent from the electronic control unit 20, the transistor Tr1 can open or close the line between the control terminal Ta of the drive circuit 30 and the ground.

The capacitor C1 is connected between the output terminal of the regulator circuit 31 and the control terminal Ta of the drive circuit 30.

The resistance element R4 is connected between the output terminal of the regulator circuit 31 and the control terminal Ta of the drive circuit 30. The resistance element R3 is connected between the control terminal Ta of the drive circuit 30 and the ground. The resistance element R2 is connected between the capacitor C1 and the transistor Tr1. The resistance element R1 is connected between the base terminal of the transistor Tr1 and the output terminal of the regulator circuit 31a.

Next, the action of the motor drive device 10 of the present embodiment will be described. When the ignition switch IG is turned off, the electronic control device 20 produces a signal of a high level. At this time, the transistor Tr1 remains turned on. Thereafter, when the operator turns the ignition switch IG on, a battery voltage is applied to the regulator circuit 31 from the battery Ba through the ignition switch IG.

Figure 2:
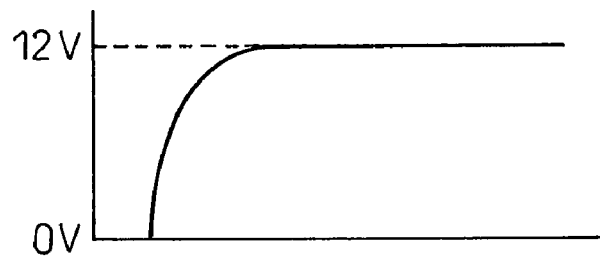
FIG. 2 is a diagram illustrating changes in the input voltage and output voltage of a regulator and in the voltage at a control terminal of a control circuit in FIG. 1.
Figure 2:
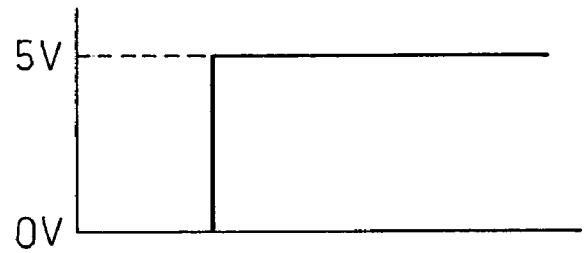
Figure 2:
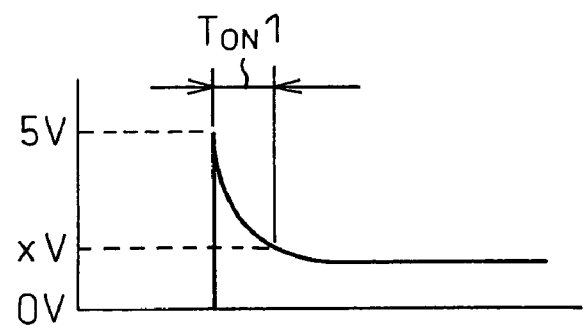

If the level of the battery voltage given to the regulator circuit 31 exceeds a predetermined level (e.g., 12 V) as shown in FIG. 2(a), the output voltage Vr of the regulator circuit 31 quickly rises as shown in FIG. 2(b). The regulator circuit 31 starts producing a constant voltage (5 V). Therefore, the capacitor C1 is electrically charged based on the output voltage of the regulator circuit 31.

When the output voltage Vr of the regulator circuit 31 rises (i.e., when the output voltage quickly rises) due to the turn-on of the ignition switch IG, an electric current flows through the ignition switch IG into the regulator circuit 31. The electric current from the regulator circuit 31 flows through the capacitor C1 into the resistance element R3. Further, the electric current flows into the resistance element R2 and the transistor Tr1 which are parallel to the resistance element R3. Thereafter, the capacitor C1 is no longer electrically charged and no electric current flows through the capacitor C1.

Due to the electric current flowing through the capacitor C1, the voltage at the control terminal Ta of the drive circuit 30 rises quickly as shown in FIG. 2(c). Thereafter, the voltage at the control terminal Ta gradually decreases to become smaller than the threshold value xV and approaches a constant voltage. The constant voltage is equal to the voltage obtained by dividing the output voltage Vr of the regulator circuit 31 by the resistance elements R4, R3 and R2.

Therefore, the voltage level at the control terminal Ta is more than the threshold value xV over a period Ton1. While the voltage level at the control terminal Ta is more than the threshold value xV, the drive circuit 30 drives the brushless motor 1. Therefore, the brushless motor 1 rotates its output shaft over a period Ton1. The rotation changes the contact surfaces of the inner ring, outer ring and balls in the bearing. Therefore, even when the blower is not used, the turn-on of the ignition switch IG can rotate the brushless motor 1 and change the position of surfaces which may be damaged. The position change prevents the bearing from being damaged many times at the same positions.

Thereafter, when the operation of the electric blower is to be started, a pulse signal Pa is produced by the electronic control unit 20 to switch transistor Tr1.

When the pulse signal Pa is at a low level, the transistor Tr1 is turned off, and an electric current flows from the output terminal of the regulator circuit 31 into the resistance elements R4 and R3. Therefore, the output voltage of the regulator circuit 31 is divided by the resistance elements R4 and R3, and the divided voltage is supplied to the control terminal Ta of the drive circuit 30. At this moment, the voltage SV at the control terminal Ta is at a level greater than the threshold value xV.

Further, when the pulse signal Pa is at the high level, the transistor Tr1 is turned on, and an electric current flows from the output terminal of the regulator circuit 31 into the resistance elements R4, R3 and, further, flows into the transistor Tr1 through the resistance elements R2.

Therefore, the output voltage of the regulator circuit 31 is divided by the resistance elements R4, R3 and R2, and the divided voltage is supplied to the control terminal Ta of the drive circuit 30. At this moment, the voltage SV at the control terminal Ta is of a level smaller than the threshold value xV.

A period in which the voltage SV is not smaller than the threshold value xV is denoted by TH, and a period in which the voltage SV is smaller than the threshold voltage xV is denoted by TL. The drive circuit 30 varies the voltage level given to the brushless motor 1 based on a duty ratio dy determined by TH and TL. The duty ratio dy is expressed by $<dy=TH/(TH+TL)>$. Concretely, the voltage level given by the drive circuit 30 to the brushless motor 1 increases with an increase in the duty ratio dy. Therefore, the rotational speed of the brushless motor 1 increases with an increase in the duty ratio dy, increasing the flow of air through the electric blower.

According to the embodiment described above, when the output voltage Vr of the regulator circuit 31 rises due to the turn-on of the ignition switch IG, an electric current output from the regulator circuit 31 flows through the capacitor C1 into the resistance element R3 and, further, into the resistance element R2 and the transistor Tr1.

Due to the current, the voltage level at the control terminal Ta of the drive circuit 30 becomes greater than the threshold value xV over a period Tno1. Therefore, the drive circuit 30 drives the brushless motor 1 over a certain period Tno1. Therefore, even when no pulse signal Pa is being output from the electronic control unit 20, the turn-on of the ignition switch IG can rotate the brushless motor 1 and change the positions of the contact surfaces which may be damaged by vibration. Thus, the same contact positions in the bearing are not damaged many times. Thus, damage to the bearing can be suppressed without using any vibration-absorbing material.

The period Ton1 in this embodiment is so set that the brushless motor 1 can rotate but a passenger does not feel uncomfortable due to the turning of the vane wheel 5. The period Ton1 is determined by the capacitance of the capacitor C1 and by the resistances of the resistance elements R3 and R2.

Second Embodiment

The above first embodiment has dealt with an example of rotating the brushless motor 1 at the time of the turn-on of the ignition switch IG. In the second embodiment, however, the brushless motor 1 is rotated at the time of the turn-off of the ignition switch IG.

Figure 3:
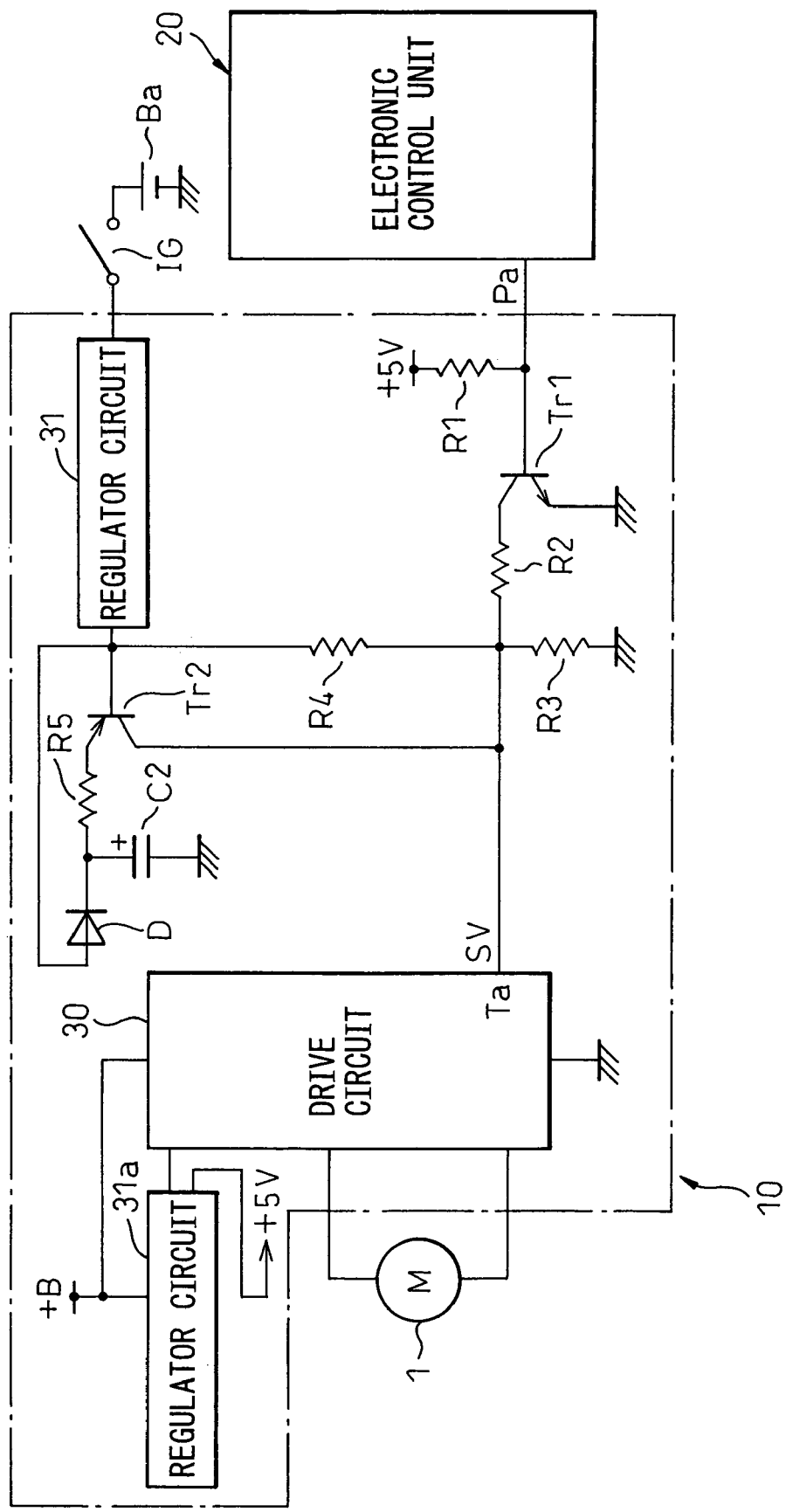
FIG. 3 is a circuit diagram illustrating an electric circuit of a second embodiment of the motor drive device of the present invention.

FIG. 3 illustrates an electric circuit of a motor drive device 10 according to this embodiment. The electric circuit has a transistor (PNP) Tr2, a resistance element R5, a capacitor C2 and a reverse current-blocking diode D in place of the capacitor C1 of FIG. 1. The reverse current-blocking diode D and the capacitor C2 are connected in series between the output terminal of the regulator circuit 31 and ground.

The transistor Tr2 and the resistance element R5 are connected in series between the positive terminal (+) of the capacitor C2 and the control terminal Ta of the drive circuit 30. The transistor Tr2 executes the switching operation depending upon the output voltage of the regulator circuit 31.

The regulator circuit 31a directly receives electric power from the car-mounted battery Ba and applies a constant voltage (e.g., 5 V) to the drive circuit 30. The drive circuit 30 also directly receives electric power from the car-mounted battery Ba. Therefore, the drive circuit 30 is capable of driving the brushless motor 1 when the ignition switch IG is turned off.

Next, the operation of the motor drive device 10 of this embodiment will be described. When the ignition switch IG is turned on, the output voltage of the regulator circuit 31 is applied to the positive terminal of the capacitor C2 through the reverse current-blocking diode D.

In this case, the transistor Tr2 is turned off because the output voltage of the regulator circuit 31 is applied to the base terminal of the transistor Tr2. Therefore, the transistor Tr2 opens the circuit between the positive terminal of the capacitor C2 and the control terminal Ta of the drive circuit 30. Accordingly, an electric current flows from the regulator circuit 31 into the capacitor C2 through the reverse current-blocking diode D, and the capacitor C2 is electrically charged.

When the brushless motor 1 is not driven, the signal Pa from the electronic control unit 20 is a high-level signal, and the transistor Tr1 is turned on. When the pulse signal Pa, that sequentially turns on/off, is output from the electronic control unit 20 to drive the motor 1, the drive circuit 30 drives the motor 1 based on the pulse signal Pa in the same manner as in the above first embodiment.

Thereafter, when the electronic control unit 20 no longer produces the pulse signal Pa, and sends a high-level signal to the transistor Tr1, the transistor Tr1 is turned on.

When the transistor Tr1 is on, an electric current flows from the output terminal of the regulator circuit 31 through the resistance element R4 and the resistance element R3 and, further, into the transistor Tr1 through the resistance element R4 and the resistance element R2. Therefore, the output voltage of the regulator circuit 31 is divided by the resistance elements R4, R3 and R2, and is supplied to the control terminal Ta of the drive circuit 30. In this case, the voltage SV at the control terminal Ta is less than the threshold value xV. Therefore, the motor 1 is not driven.

Figure 4:
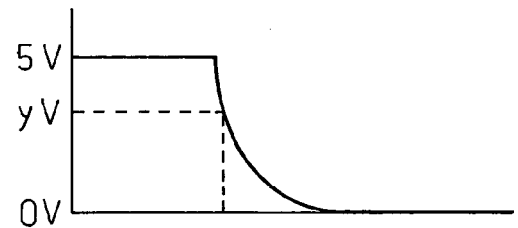
FIG. 4 is a diagram illustrating changes in the input voltage and output voltage of a regulator and in the voltage at a control terminal of a control circuit in FIG. 3.
Figure 4:
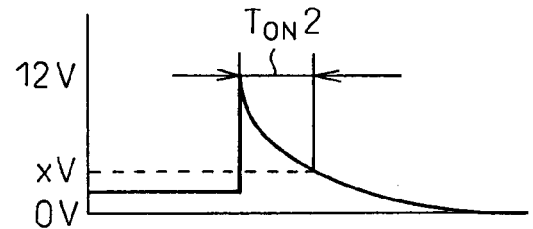

Thereafter, the operator turns the ignition switch IG off. The output voltage of the regulator circuit 31 becomes smaller than the voltage yV as shown in FIG. 4(a). Therefore, the transistor Tr2 is turned on to connect between the positive terminal of the capacitor C2 and the control terminal Ta of the drive circuit 30.

Accordingly, a discharge current flows from the positive terminal of the capacitor C2 to the resistance element R3 through the resistance element R5 and the transistor Tr2. The discharge current, further, flows to the resistance element R2 through the resistance element R5 and the transistor Tr2. Thereafter, no discharge current flows from the capacitor C2.

Due to the discharge current from the capacitor C2 as described above, the voltage at the control terminal Ta of the drive circuit 30 rises quickly as shown in FIG. 4(b) and, thereafter, gradually decreases to approach zero. Therefore, the voltage level at the control terminal Ta remains greater than the threshold value xV over a period Ton2. Namely, the drive circuit 30 drives the brushless motor 1 over the period Ton2 to thereby vary the contact surfaces of the inner ring, balls and outer ring in the bearing. This prevents the same positions in the bearing being damaged many times as in the first embodiment described above and, thus, suppresses damage to the bearing without using any vibration-absorbing material.

The period Ton2 in this embodiment is so set that the brushless motor 1 rotates but the passengers will not feel uncomfortable by an air flow caused by the turning of the vane wheel 5. The period Ton2 is determined by the capacitance of the capacitor C2 and the resistances of the resistance elements R5, R3 and R2.

In the above first and second embodiments, the motor drive device 10 according to the invention was applied to a seat air-conditioning device. However, the motor drive device according to the invention may be applied to various kinds of devices that may receive shock.

In the above first and second embodiments, a brushless motor is used as the electric motor. However, a variety of electric motors may be employed, such as three-phase motors, DC motors and the like.

In the above first and second embodiments, the bearing (i.e., ball bearing) has the inner ring, balls and outer ring. However, a variety of bearings may be employed, such as needle bearings and the like.

What is claimed is:

1. A motor drive device for driving an electric motor having a bearing for rotatably supporting an output shaft, comprising:
    a drive circuit having a signal input terminal and driving said electric motor when a voltage level at said signal input terminal becomes greater than a threshold value in response to a control signal output from an electronic control unit,
    wherein, when a power source switch is turned on, the voltage level at said signal input terminal becomes greater than said threshold value for a first certain period.

2. A motor drive device according to claim 1, further comprising:
    a capacitor connected between said signal input and the power source switch and applied with a voltage from a battery through said power source switch; and
    resistance elements connected between said capacitor and ground;
    wherein an electric current flows from said power source switch through said capacitor to said resistance elements when said power source switch is turned on, and the voltage level at said signal input terminal becomes greater than said threshold value for said first certain period due to the flow of the electric current.

3. A motor drive device for driving an electric motor having bearings for rotatably supporting an output shaft, comprising:
    a drive circuit having a signal input terminal and driving said electric motor when a voltage level at said signal input terminal becomes greater than a threshold value in response to a control signal output from an electronic control unit,
    wherein, when a power source switch is turned off, the voltage level at said signal input terminal becomes greater than said threshold value for a second certain period.

4. A motor drive device according to claim 3, further comprising:
    a capacitor electrically charged with a voltage supplied from a battery through said power source switch;
    a transistor between said capacitor and said signal input terminal, open when said power source switch is turned on and closed when said power source switch is turned off, between said capacitor and said signal input terminal; and
    resistance elements being connected between said signal input portion and ground;
    wherein a discharge current flows from said capacitor through said transistor and said resistance elements when said power source switch is turned off, and the voltage level at said signal input terminal becomes greater than said threshold value for said second certain period due to the flow of the discharge current.

5. A motor drive device according to claim 1, further comprising a transistor connected between said signal input terminal and ground, wherein said transistor is turned on/off, based on a control signal sent from said electronic control unit, to vary the voltage level at said signal input terminal.

* * * * *